Oct. 18, 1966  L. H. FOSTER ETAL  3,279,941
METHOD OF FORMING A MOISTURE-COLLECTING
COATING OF POROUS GLASS
Filed Feb. 14, 1963
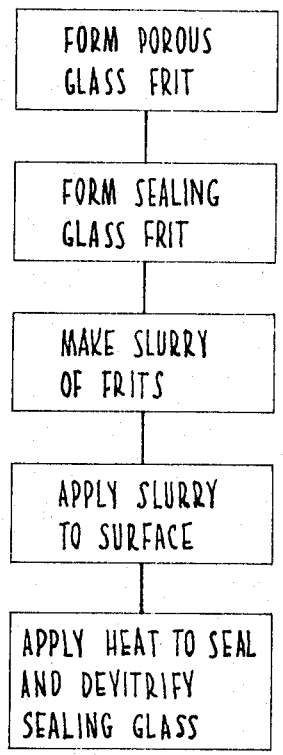
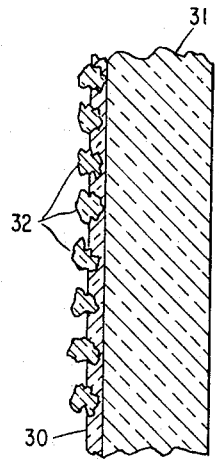
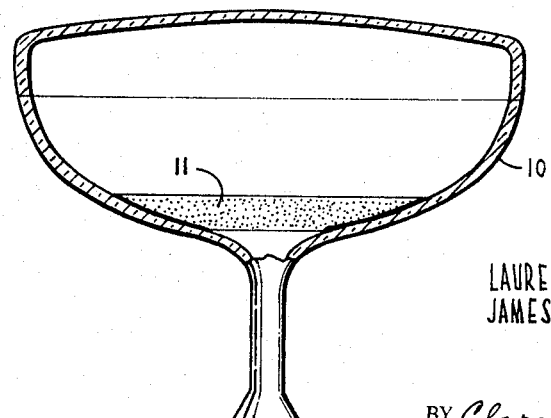
LAURENCE H. FOSTER
JAMES H. GRAY
        INVENTORS
BY Clarence R. Patty, Jr.
    ATTORNEY 3,279,941
METHOD OF FORMING A MOISTURE-COLLECTING COATING OF POROUS GLASS
Laurence H. Foster, Corning, and James H. Gray, Painted Post, N.Y., assignors to Corning Glass Works, Corning, N.Y., a corporation of New York
Filed Feb. 14, 1963, Ser. No. 258,531
4 Claims. (Cl. 117—124)

This invention relates to moisture-collecting getters and more particularly to getter compositions particularly adapted for application to the inner surfaces of electronic vacuum tubes and other devices wherein it is desirable to eliminate water vapor.

Getters are generally employed in electric vacuum tubes in order to remove residual traces of gases left inside such tubes after their evacuation. Such getters are generally barium compounds, which, although they effectively collect most gases, do not completely eliminate water vapor from such tubes.

Accordingly, an object of the present invention is to provide a getter which is effective in removing water vapor from electronic tubes.

A further object is to provide a getter which may be applied as a coating to the inner surfaces of electronic devices.

A further object is to provide a method for applying a getter in the form of a thin coating.

A further object is to provide a getter which may be applied as a coating on the interior surface of television picture tubes and which will withstand the subsequent processing to which such tubes are subjected during manufacture, including washing with hydrofluoric acid.

The moisture-collecting ability of porous glass bodies is well known, and such bodies have been utilized as getters in the form of single wafers of porous glass. It was not until the present invention, however, that it became known that this material can be applied in the form of coatings on the inner surfaces of electronic devices, thus allowing the construction of smaller devices and presenting increased getter surface areas.

The term "porous glass" as used herein refers to glass which contains an intricate network of interconnected voids and channels extending therethrough. The process of manufacture comprises generally the steps of forming an object of glass within certain composition ranges, subjecting the glass to heat treatment in order to separate it into two phases only one of which is soluble, and subsequently dissolving out the soluble phase to produce the void space. A detailed description of the properties of such glass and its method of manufacture is given in United States Patent 2,215,039, issued to H. P. Hood and M. E. Nordberg, and the term "porous glass" is used herein to refer to all porous compositions within the scope of that patent, as well as to other glasses having similar pore structures.

The superior gettering qualities of porous glass result from the extremely high surface area produced by its void space, which area varies between about 150–200 m.$^2$ per gm. and its high percentage of void space, which comprises about 28% of its volume. Due to these factors, glass has the capacity to absorb water in amounts up to 25% of its dry weight.

For many applications, it is inconvenient or impossible due to space limitations to include wafers or other objects of porous glass as getters within enclosures. Accordingly, the desirability of forming such getters as coatings on the inner surfaces of such enclosures is evident. In addition to having negligible effects on the size of such enclosures, such coatings provide maximum surface to volume ratios and accordingly present maximum possible surface areas for the collection of moisture.

Porous glass cannot be melted and fused to a surface and subsequently function as a getter, since when the glass melts, its porous structure collapses, and its moisture-collecting voids disappear. Accordingly, it was found necessary to develop a novel method for providing a coating containing porous glass.

The present applicants have found that coatings according to the invention may be produced by forming a frit of porous glass, mixing this frit with a second frit comprising a soft sealing glass, forming a suspension of the mixture, applying the suspension to the surface to be coated, and heating the suspension to the sealing temperature of the sealing glass to drive off volatile materials and bond the porous glass particles to the surface.

It has been found that, contrary to expectations, the pores of the porous glass are not closed by the sealing glass, nor do they retain the liquid used in forming the suspension, but that after the coating is bonded to a substrate, moisture is able to enter the porous glass particles through their exposed faces and collect within the pore structures of the particles.

A specific example of the invention will be described with reference to the accompanying drawing, in which FIG. 1 is a flow diagram illustrating the steps of the process of the invention, FIG. 2 is a longitudinal sectional view through a cathode ray tube envelope having on its inner surface a getter coating according to the invention, and FIGURE 3 is an enlarged sectional view taken through a coated portion of the cathode ray tube of FIGURE 2.

Coating 11 is placed on cathode ray tube envelope 10, which is the type utilized in television picture tubes, as follows:

A quantity of porous glass having a composition approximately 96.5% $SiO_2$, 3% $B_2O_3$ and 0.5% $Al_2O_3$ was ground in a ball mill and screened to provide a frit capable of passing through a 300 mesh screen, and a quantity of sealing glass having a composition approximately 76.5% PbO, 11.0% ZnO, 9.1% $B_2O_3$, 2.4% $SiO_2$ and 1.0% $Al_2O_3$ was similarly ground to a frit capable of passing through a 100 mesh screen. The frits were mixed in the ratio by weight of 5 parts sealing glass to 1 part porous glass, and enough water was added to the mixture to provide a sprayable slurry. Although water was chosen as a readily available vehicle for forming a suspension of the frits, other volatile liquids may be used. Band 11, approximately two inches in width was sprayed on the inner surface of cathode ray tube envelope 10. The envelope was then heated from room temperature to 440° C. at the rate of 10° C. per minute, held at that temperature to effect a seal and to effect devitrification of the sealing glass in accordance with the teachings of United States Patent 2,889,952, issued to S. A. Claypoole. The envelope was then cooled to room temperature at the rate of 5° C. per minute to form a solid coating approximately .002 inch in thickness.

As illustrated in FIGURE 3, the devitrified sealing glass forms a thin coating 30 on the glass substrate 31, and contacts only the lower portions of porous glass particles 32, thereby leaving portions of the porous glass exposed.

Although coatings applied in the above manner may be formed using any conventional sealing glass, which term is used to include all glasses having softening temperatures lower than both that of porous glass and that of the substrate upon which the coating is applied, it has been found particularly advantageous when applying coatings to television picture tubes and other articles requiring further heat treatment to utilize devitrifiable sealing glasses and to effect devitrification thereof according to the method of the said Claypoole patent. An effect of such devitrification is to elevate the softening temperature of the sealing glass after sealing and hence to render it capable of withstanding subsequent bakeout cycles, where temperatures often exceed the softening temperatures of sealing glasses in their vitreous states.

The present coatings may comprise a mixture of porous glass and sealing glass in any proportions which will provide the necessary gettering capacity and in which sufficent sealing glass is present to bond the porous glass to the surface, and, accordingly, all coatings in which particles of porous glass are bonded to a surface as a getter by means of a sealing glass are within the scope of the present invention. Although the relative amounts of the two components will vary somewhat with variations in sealing glass composition, it has been found preferable, when the getter coating is applied in a cathode ray tube which is to be subjected to an acid wash during processing, for the porous glass to comprise between 12 and 25% of the mixture. When the coating is applied to articles which are to be subjected neither to an acid wash nor to substantial abrasion, the porous glass component may represent up to 75% of the mixture.

Coatings according to this invention may be used wherever it is desired to provide means for collecting moisture. Although the present coatings have particular utility in electronic devices, both in vacuum tubes and in semiconductor devices such as transistors and diodes, other applications for such coatings will be apparent as their need arises. The present invention contemplates the formation of coatings containing porous glass particles bonded by means of a sealing glass to any surface to which such sealing glasses may be bonded.

Accordingly, the invention is not to be limited to the specific example described by way of illustration, but rather only by the scope of the appended claims.

What is claimed is:

1. The method of forming a moisture-collecting coating on a surface which comprises the steps of forming a suspension of particles of porous glass and particles of sealing glass in a liquid, each said particle of porous glass having a continuous network of minute interconnected channels extending therethrough, applying a coating of said suspension on said surface, and heating said suspension to a temperature at least as high as the softening temperature of said sealing glass but less than the softening temperature of said porous glass for a time sufficient to remove said liquid from said suspension and to seal said porous glass to said surface, and subsequently cooling said surface.

2. The method according to claim 1 which includes the step of maintaining said sealing glass at an elevated temperature for a time sufficient to devitrify said sealing glass.

3. The method of forming a moisture-collecting coating on a surface which comprises the steps of forming a mixture comprising from 12% to 25% by weight of porous glass particles and from 75% to 88% of sealing glass particles, each said porous glass particle having a continuous network of minute intercommunicating channels extending therethrough, forming a suspension of said mixture in a liquid, depositing said suspension on said surface, heating said suspension to a temperature at least as high as the softening temperature of said sealing glass but less than the softening temperature of said porous glass particles for a time sufficient to volatilize said liquid and to devitrify said sealing glass, and subsequently cooling said surface.

4. The method of forming a moisture-collecting coating on a surface which comprises the steps of forming a suspension in a liquid of a mixture of from 12% to 75% porous glass particles and from 25% to 88% of sealing glass particles by weight, each said porous glass particle having a continuous network of minute intercommunicating channels extending therethrough, applying a coating of said suspension to said surface, and heating said suspension to a temperature at least as high as the softening temperature of said sealing glass particles but lower than the softening temperature of said porous glass particles for a time sufficient to volatilize said liquid and to seal said porous glass particles to said surface.

References Cited by the Examiner

UNITED STATES PATENTS

| Re. 25,017 | 8/1961 | Cooper | 117—97 |
|---|---|---|---|
| 488,683 | 12/1892 | Vollrath | 117—23 |
| 1,830,165 | 11/1931 | Gustin | 313—116 |
| 1,854,988 | 4/1932 | Fuwa | 313—116 |
| 1,971,945 | 8/1934 | Winninghoff | 313—221 X |
| 2,215,039 | 9/1940 | Hood | 65—31 |
| 2,295,694 | 9/1942 | Slack et al. | 313—178 |
| 2,810,660 | 10/1957 | Carpenter | 313—113 |
| 2,889,952 | 6/1959 | Claypoole | 220—2.1 |

FOREIGN PATENTS 494,416  10/1938  Great Britain.

JAMES W. LAWRENCE, Primary Examiner.

GEORGE WESTBY, Examiner.

R. JUDD, Assistant Examiner.